United States Patent Office 3,349,043
Patented Oct. 24, 1967

3,349,043
METHODS AND COMPOSITIONS FOR CONTROLLING OXIDATION OF METAL SURFACES
John A. Manning, Hinsdale, Mass.; Harry J. Dame, executor of said John A. Manning, deceased, assignor to Manning Development Corporation, Lenox, Mass., a corporation of Massachusetts
No Drawing. Filed Jan. 19, 1966, Ser. No. 521,541
12 Claims. (Cl. 252—407)

This application is a continuation-in-part of copending application Ser. No. 310,853, filed Sept. 23, 1963, by applicant herein, John A. Manning, now abandoned.

The present invention relates to methods for controlling oxidation of metal surfaces and to compositions having utility in such methods. Oxidation control, as herein contemplated, includes both removal of existing oxides and inhibition or prevention of oxidation of metal surfaces. The invention is applicable to the treatment of a wide variety of metals, e.g. copper, brass, iron, aluminum, magnesium, zinc and uranium; in an important specific aspect, it is particularly directed to methods and compositions for removing rust (i.e. iron oxides) from, and inhibiting rust formation on, ferrous metal surfaces.

The invention broadly embraces the discovery that oxides may be removed from a metal surface, and subsequent oxidation thereof may be prevented, by applying to the surface at least one diketone selected from the class consisting of 2,4 pentanedione and 2,5 hexanedione, in the presence of water. Stated thus broadly, the method of the invention contemplates the step of applying the diketone (in any convenient manner and, for example, in water or other liquid or semi-liquid vehicle compatible with the diketone) to the metal surface to be treated, in the presence of water.

The invention also embraces the further discovery that oxidation removal and prevention may be accomplished with very superior effectiveness by applying to a metal surface, in the presence of water, a mixture of at least one of the above-named diketones (very preferably 2,4 pentanedione) and another compound or compounds, e.g. an acid, as set forth below. That is to say, while the diketone alone, in the presence of water, exhibits an oxidation-controlling effect, markedly enhanced removal and prevention of oxidation on metal surfaces are attained by utilizing in mixture therewith in the present method another compound or compounds as hereinafter described.

In these embodiments of the method, the mixture of diketone an acid or other compound may be established (for application to the metal surface to be treated) in water or any other convenient liquid or semi-liquid vehicle which is compatible with the diketone and in which the other compound is soluble. The concentrations and relative proportions of mixture constituents in the vehicle are not at all critical, but may be varied very widely depending on such factors as convenience, economy, and (in some instances, as hereinafter illustrated by specific examples) the particular treatment contemplated. In the practice of the method, the mixture-containing vehicle is applied to the surface or object to be treated in any convenient manner, as by immersion of the object therein or by spraying, painting, or wiping on the surface, either at room temperature or (to accelerate its action) with the mixture-containing vehicle heated. This application is effected in the presence of water, for example water constituting or incorporated in the vehicle, and is desirably followed by further washing of the treated surface with water.

The method of the invention in its described embodiments may be applied either to the treatment of oxide-bearing metal surfaces, such as rusty ferrous-metal surfaces, to remove the oxide and inhibit subsequent oxide formation, or to the treatment of fresh, clean metal surfaces (for example, as a pretreatment before painting or other surface coating) to prevent oxidation thereon.

In a specific sense, the invention is further and particularly directed to certain compositions having special effectiveness for oxidation control, especially for removal of iron oxides and prevention of oxidation of ferrous metal surfaces, as well as other advantageous properties.

One group of such compositions comprises a mixture of at least one of the above-named diketones (very preferably 2,4 pentanedione) and at least one compound selected from the class consisting of keto acids, alkali metal and alkaline earth metal esters of keto acids, glycolic acid, diglycolic acid, gluconic acid, and tannic acid, conveniently in water or other vehicle. while water is a preferred vehicle for many purposes, other vehicles suitable for use with these mixtures are oils (e.g. hydrocarbon oils, silicone oils, and other oleaginous materials), paints, glycols, alcohols, and waxes. As in the general case stated above, any vehicle compatible with 2,4 pentanedione and in which the other compound is soluble may be employed, and the concentrations and relative proportions of mixture constituents therein may vary widely. In general, it is preferred that at least about 0.1% (preferably at least about 0.5%) by weight of the mixture of 2,4 pentanedione and other compound be 2,4 pentanedione and that the other compound be present in the mixture in a proportion of at least about 1% by weight. A suitable exemplary range of proportions in these mixtures, e.g. mixtures of 2,4 pentanedione and keto acid, is 0.1–100 parts by weight of 2,4 pentanedione to 5–200 parts by weight of keto acid.

These compositions, when applied to a metal surface in the presence of water in accordance with the method of the invention, are, as stated, found to be especially effective both in removing rust or other oxides from metal surfaces and in preventing subsequent oxidation of metal surfaces to which they are applied. Further, it is found that these compositions are much more efficacious in achieving these results than either of their constituents alone, indicating that the mixture constituents (i.e. 2,4 pentanedione and the other compound selected from the above-named class) act synergistically to produce the desired effects.

The nature of the action of these compositions and of the synergism involved is not at present fully understood. With respect to the removal of rust or other pre-existing oxide with a metal surface, the compositions (in the presence of water) appear to convert the oxides to water-soluble compounds, resulting in dissolution of the oxide in the composition vehicle, e.g. water, or producing a flaking and loosening of the oxide coating which renders it readily removable by subsequent rubbing, abrasion, or even water washing. It is presently believed that the action of the 2,4 pentanedione in these compositions involves absorption of oxide oxygen probably by loss of a highly active hydrogen from a carbon atom adjacent a carbonyl carbon with addition of the oxygen at that point, as indicated by color changes and the large rust-dissolving capacity of these compositions. Also, the vehicle containing the mixture of 2,4 pentanedione and other above-named compound exhibits significantly lowered surface tension, enabling ready penetration of difficulty accessible localities as between tight-fitting parts, this property being understood to be imparted by the 2,4 pentanedione. In any event, the 2,4 pentanedione apparently provides a high degree of rust-wetting ability and oxygen absorption capacity.

It is further believed that the acid or other compound in the mixture depresses or modifies the action of the 2,4 pentanedione so that when the latter reacts with oxides of iron, for example, a water-soluble diketone-iron complex is formed instead of the insoluble complex normally formed when the diketone comes into contact with such oxide.

Concerning the oxidation-inhibiting effect of the described compositions, it may be explained that formation of rust or other oxide on metal surfaces is believed to be caused by the presence of minute electrolytic cells generated by impurities, environment, and the base metal; and it is further believed that application of the compositions of the invention in the presence of water neutralizes these cells with the result that oxide-forming reaction of oxygen with the treated metal surface is at least very substantially inhibited, in ordinary or even in moist atmospheres, for very long periods of time after treatment.

The compositions of the invention effect the described oxide removal and inhibition of metal surface oxidation without attacking or in any way adversely affecting the base metal, and leave the treated metal surface clean and shiny. Further, the protection afforded the metal surface against subsequent oxidation is provided without any film or residue of the composition remaining on the treated metal surface.

In the described group of compositions, those presently preferred are mixtures of 2,4 pentanedione and one or more keto acids. Examples of keto acids are ascorbic, 2 keto-1-gulonic, diacetone-2 keto-1-gulonic, pyruvic, acetoacetic, levulinic, o-benzoylpropionic, and beta-benzoylpropionic acids. Of these, mixtures of 2,4 pentanedione and ascorbic acid are especially preferred as constituting particularly effective compositions.

It is found that 2,4 pentanedione and a keto acid, when mixed under appropriate conditions, form a reaction product which itself constitutes a very effective rust removing and inhibiting agent upon application to a metal surface in the presence of water in accordance with the method of the invention. If, for example, the keto acid and 2,4 pentanedione are mixed in water and the water is thereafter removed, the reaction product remains as a solid crystalline substance which can be redissolved in water for use. However, it is not necessary to convert the reaction product to solid state; for convenience, the 2,4 pentanedione and keto acid may simply be mixed in water or other appropriate vehicle and applied to the metal surface to be treated, in the presence of water.

For many applications of the present invention, water is a preferred vehicle for the keto acid—2,4 pentanedione mixture. When water is employed as the vehicle, it is preferred that the pH of the composition be substantially neutral, i.e. between about 6.9 and about 7.1, although a neutral pH is not necessary to operability. The pH of the composition may be adjusted for example by adding sodium hydroxide or the like as when the pH is initially below 7.

One example of an effective rust removing and inhibiting composition in accordance with the present invention is as follows:

MIXTURE A

| | | |
|---|---|---|
| Ascorbic acid | oz | 2 |
| 2,4 pentanedione | oz | 16 |
| Water | gal | 1 |

In the preparation of this mixture, the constituents are simply mixed together. There is no need to heat the mixture; although the acid-diketone reaction is endothermic, it proceeds at room temperature from ambient heat to produce the reaction product. The produced mixture is a clear, pale yellow liquid having a boiling point of about 198° F., and a freezing point of about 22° F. It is non-flammable, and is miscible in a wide variety of solvents, e.g. water, alcohols, and glycols.

This composition, in various dilutions, is applicable to the removal of iron oxides from ferrous metal surfaces and to the prevention of rusting on such surfaces as well as to the removal and prevention of oxidation on other metal surfaces. The dilution at which the mixture is used is dependent on the conditions encountered and the results desired to be achieved.

For example, rust (red and brown iron oxides) may be removed from the surface of a ferrous metal object by immersing the object in a bath of mixture A and water, e.g. a bath containing one part mixture A to four parts additional water, although for rust removal the mixture is effective over a wide range of concentrations from full strength to dilutions as great as one part mixture A to 100 parts additional water. The mixture converts the oxides to water-soluble compounds, and thus effects their removal by dissolution in the aqueous vehicle; also, the mixture greatly facilitates mechanical removal of rust coatings as with a wire brush or steel wool in cases where immersion is not continued until dissolution of the rust is complete.

The action of the composition may be accelerated by providing agitation or pressure flow in the bath, or by heating the bath to a temperature in the range of about 150°–180° F., such heating being found to enhance the rate of rust-removing reaction by as much as a factor of 10 to 15. Even without these reaction-promoting steps, an immersion time of 2 to 30 minutes is in many instances sufficient to effect essentially complete removal of rust. More generally, the treatment time may vary from a few minutes to 8 or more hours, depending on the operating conditions employed (such as agitation and heating); the severity of rusting present; and the accessibility to the solution of the surface to be treated, i.e. whether exposed or requiring penetration between adjacent contacting metal faces. Preferably, the immersion treatment is followed by a rinse in water which aids in dissolving any residue remaining on the metal surface.

In the case of very heavy rust coatings, the treatment time may be decreased by wire-brushing the rusted surface after 15 minutes' immersion, when puffing and cleavage of the rust coating have developed; or, after several hours' immersion in the mixture A solution, by subjecting the object to successive immersions in hot or cold water until the base metal surface appears. Alternatively, a heavily rusted object may be immersed for 30 minutes in a full-strength bath of mixture A, then immersed in a solution of one part mixture A to 50 parts additional water until the bare metal is exposed, and then rinsed in running water to complete the removal of rust.

The described mixture A is also effective to remove black iron oxide ($Fe_3O_4$). For such use, the object to be treated is preferably immersed in a very dilute solution of mixture A, e.g. a solution containing one part mixture A to 50–100 additional parts of water. In this instance, occluded oxygen in the water promotes oxidation of the black oxide to the higher oxides which are soluble in the mixture; immersions of 2 to 3 days may be necessary with very heavy deposits of black iron oxides.

By the described treatment using the composition of mixture A, complete removal of red and brown rust and/or black iron oxide is very readily and effectively achieved, yet the mixture does not attack or otherwise impair the surface of the base metal; thus, the composition may be employed to treat precision tools. In addition, application of the mixture to a ferrous metal surface prevents subsequent rusting or formation of black iron oxide thereon, under conditions of normal atmospheric exposure or even immersion in water, for periods as long as 3½ years. This oxidation-inhibiting effect is achieved by the initial treatment and does not require that any film or residue of the mixture remain on the metal surface; apparently (as presently believed) the mixture acts in some way to neutralize minute electrolytic cells otherwise capable of fixing oxygen on the iron to produce oxidation.

It will be appreciated that mixture A may be employed in a wide variety of circumstances to effect removal and/or prevention of iron oxide formation. For example, it may be applied to large steel structures e.g. as a rust-preventing pretreatment before painting; used to de-rust boilers and the like; or applied to freshly machined surfaces to prevent finger-mark oxidation. While application by immersion of the object to be treated in a bath of the mixture has been described above for purposes of illustration, the mixture may be applied in any other convenient manner, as by brushing, rag wipes or spraying (preferably with nitrogen gas).

As examples of specific applications, the mixture may be used to loosen nuts and bolts which are frozen in situ by oxidation; for such use, an effective procedure comprises brushing on (or immersing the object to be treated in) mixture A at full strength. The time required is ordinarily between about 2 and about 20 minutes. The lowered surface tension which is a characteristic property of the mixture provides an enhanced wetting and penetrating action advantageous for such application.

Also, the mixture has utility for derusting springs, and restores them to operability; it has no hydrogen-embrittling effect.

As a still further example, newly fabricated wire bearing millscale, sprayed with a solution of one part mixture A to ten parts of water, and left to dry for a period of approximately one half hour, may be easily nickel plated and the plating does not deteriorate even under conditions of extended exposure to moisture, whereas similar wire not so treated does not take nickel plating evenly, and the plating is largely removed under comparable conditions of exposure.

Effective removal of oxides from, and prevention of oxidation on, surfaces of other metals (such as copper, zinc, brass, aluminium and uranium) is also provided by application thereto of mixture A, preferably at full strength.

As already explained, in mixtures such as the foregoing, the 2,4-pentanedione and ascorbic acid exhibit a very significant synergistic effect. Thus, 2,4 pentanedione alone in exposure to an oxide-bearing ferrous metal surface may produce non-water soluble intermediate compounds and crystals of iron 2,4 pentanedione (a known, insoluble compound); although 2,4 pentanedione in water, applied to a rusted ferrous-metal surface, effects a flocculation of the rust that facilitates mechanical rust removal as by subsequent abrasion of the rust-bearing surface, no rapid and complete rust removal is achieved as in the case of use of mixture A above even in highly dilute solution. Similarly, ascorbic acid alone (or other keto acids) applied to a rusty surface of a ferrous metal initially forms a gas layer but effects little or no dissolution of the rust.

In further illustration of the synergistic action of the constituents of the composition, a group of steel washers having substantial coatings of rust were respectively immersed for 24 hours in solutions of 2,4 pentanedione alone, ascorbic acid alone, and mixture A in a dilution of one part to 100 parts of water. At the end of the test interval, in the solution of 2,4 pentanedione alone slight discoloration of the solution was observed, but no iron pentanedione had formed, no rust had been removed from the washer and no rust removal was effected by shaking. In the ascorbic acid solution, the rust had become black in appearance but no metal surface was observed on the washer; some flaking of rust occurred, especially on agitation. In contrast, in the solution of mixture A, 90 to 95 percent of the metal surface of the washer was exposed. Some black iron oxide remained adherent to the washer, but was easily removed.

It will be appreciated that the composition designated mixture A above is illustrative of ascorbic acid—2,4 pentanedione compositions in water vehicles and that other such compositions having different relative proportions of constituents (e.g. in a range of 0.5–110 parts by weight of 2,4 pentanedione to 5–200 parts by weight of ascorbic acid) are also effective for the described applications.

Although, as stated, water is a convenient or preferred vehicle for the mixtures of the present invention for many purposes, in other cases it is advantageous to utilize an organic solvent vehicle. One example of such composition follows:

MIXTURE B

| | Percent |
|---|---|
| 2,4 pentanedione | 50 |
| Alcohol (conveniently methyl, alcohol, although any alcohol from methyl to butyl or octyl may be employed) | 25 |
| Varsol #2 (purified hydrocarbon) | 25 |

About 50 grams ascorbic acid per gallon of the three foregoing constituents.

In preparation of the latter mixture, the ingredients after mixing are heated to approximately 140° C. and as soon as boiling is observed, the temperature is reduced to 70° C. This temperature is maintained for two hours, and at the end of that time the mixture is cooled to room temperature. The boiling point of the finished product is approximately 71° C.

The composition of mixture B has particular utility as a crank case or gasoline tank additive for automobiles to prevent and remove rust in the engine or tank, converting the rust to dissolved or liquid compounds having no deleterious effects in the gasoline or oil. As used in lubricating oil, grease and hydraulic oil, it also has several important subsidiary advantages.

Thus, the composition substantially lowers the surface tension of the oil or lubricant in which it is incorporated providing greatly enhanced wetting action for the lubricant and enabling it to penetrate otherwise inaccessible engine parts, i.e. facilitating effective lubrication; its action in this respect is at least comparable to that of sperm oil, which is now employed for such purposes in certain special circumstances. Dissolution and removal of sludge from the oil or lubricant is also effected by addition of mixture B thereto, and oil oxidation is prevented.

These latter advantages are also realized with various other formulations including mixtures of 2,4 pentanedione, ascorbic acid or other keto acids and organic (e.g. hydrocarbon) vehicles. That is to say, while in all these cases the compositions have a primary effect in removing or preventing rust or other metal oxidation, they also have desirable secondary effects as in dissolving hardened oils, preventing sludging, and promoting thorough wetting and lubrication of metal surfaces by the hydrocarbons to which they are added, due to the aforementioned surface tension-lowering effect. The wetting action imparted by the composition promotes maintenance of an oil film containing such composition on the metal surface, with close adherence of the film to the surface to be protected, which extends the period of time over which effective rust prevention continues.

As will be appreciated, when an organic vehicle is used, it is necessary that water be present for attainment of the desired metal oxidation control effect of the composition. Such water, however, may be found to occur inherently under the conditions of use, as for example in cases where significant atmospheric moisture may be taken up, or if desired small additions of water may be made to the composition before or during use. Again, in some instances the composition without water may be applied to bearings or other parts and upon subsequent introduction of water to these localities the composition will act therewith to prevent rusting which would otherwise occur owing to such presence of water.

It will be appreciated further that the foregoing specific examples are merely illustrative of vehicles which may be employed in the present compositions. Other suitable vehicles include waxes, oils, petroleum fractions and alcohols. Suitable waxes are hydrocarbon waxes such as paraffin and microcrystalline waxes (petrolatum), e.g. as listed at page 64, table 21, of Petroleum Refinery Engineering by W. T. Nelson, McGraw-Hill Book Company, Inc., 1949; beeswax and vegetable waxes. The thickness of the wax is not critical and may be selected to provide a desired composition viscosity. Suitable alcohols include methyl, ethyl, n-propyl, n-butyl, n-pentyl, n-hexyl, n-octyl, n-heptyl, isopropyl, isobutyl, sec-butyl, tert-butyl, allyl, benzyl, and aromatic alcohols such as phenol, pyrocatechol, resorcinol, hydroquinone, pyrogallol, cresol, and benzyl alcohol; still others are listed in Organic Chemisty, Morrison & Boyd, page 305, published by Allyn and Bacon, Inc., 1962. Suitable petroleum fractions include naphtha, kerosene, and gasoline.

Another group of compositions in accordance with the present invention having particular effectiveness for use in the described method and especially for removal of rust and scale are mixtures consisting essentially of at least one diketone selected from the group consisting of 2,4 pentanedione and 2,5 hexanedione; and a compound selected from the group consisting of sodium, potassium and ammonium hydroxides, cyanides, cyanates, and sulfocyanides, preferably in an aqueous vehicle, e.g. water. Preferably, for each 0.5 to 125 cc. of diketone in such mixtures there is present between about 10 and about 300 grams of the other named compound.

A still further group of compositions in accordance with the present invention are mixtures of the above-named diketones (preferably 2,4 pentanedione) and salts of organic acids having 6 to 12 carbon atoms such as sebacic, azeleic, and pelargonic acids, e.g. lead, zinc, tin, chromium, cadmium, sodium and potassium salts, in either an aqueous or a nonaqueous vehicle. These mixtures are generally more effective for preventing oxidation of metal surfaces than for removing existing oxides, although their application to rusted surfaces in the presence of water results generally in a puffing or blistering of the rust that facilitates mechanical removal of the rust as by scraping or like operations. The 2,4 pentanedione, in addition to improving oxidation-controlling properties of the mixtures, solubilizes the other materials to enable their easy application, and lowers surface tension i.e. providing improved wetting ability. In these mixtures there is in general apparently no formation of a reaction product as occurs in mixtures of 2,4 pentanedione and keto acids; i.e. no crystalline product is obtained upon mixing the diketone and salt in a vehicle such as water and removing the vehicle. A general formula for mixtures of 2,4 pentanedione and metal salts of organic acids is as follows:

|  | Specific Example | Preferred Range |
| --- | --- | --- |
| 2,4 pentanedione, cc. | 100 | 1-150 |
| Metal salt of organic acid, gr. | 50 | 5-125 |
| Vehicle | To 1,000 cc. or as desired for strength | |

All the described mixtures may, if desired, be stabilized with sodium or potassium hydroxide for recovery from freezing; and the freezing point of such mixtures may be lowered as for winter use, by inclusion therein of methyl alcohol or glycols.

While, as stated, the above-described compositions are found to be especially effective and advantageous, in its broader aspects the method of the present invention may also be practiced with any of a wide variety of other mixtures of (a) a diketone selected from the class consisting of 2,4 pentanedione and 2,5 hexanedione (preferably 2,4 pentanedione) and (b) an acid or other compound as hereinafter set forth. In general, the mixture may be established in an aqueous or other vehicle as described above, and is applied to the metal surface to be treated in the presence of water, e.g. water constituting or incorporated in the vehicle, or is left to absorb atmospheric moisture.

Thus, for example, there may be employed in the present method a mixture of 2,4 pentanedione and an organic acid other than a keto acid, established in a vehicle and preferably in a proportion of .1 to 110 parts 2,4 pentanedione to 5 to 200 parts acid, depending on the strength of the particular acid used and the desired final mixture strength. The method as practiced with these mixtures is particularly suited for unfreezing rust-frozen equipment and for preventing rust formation by application to clean metal surfaces. In the case of these mixtures, again, it is believed that there is a synergistic action between the diketone and acid whereby, for example, rust (iron oxide) is converted to water-soluble compounds.

Preferred acids are those capable of forming soluble iron salts, such as citric, oxalic, and glutaric acids; however, in general the organic acid may be either mono or poly-basic, preferably having from 6 to 14 carbon atoms, acids having 6 to 12 carbon atoms such as sebacic, azeleic, and pelargonic acids being particularly satisfactory. Either saturated or unsaturated acids may be used. Further examples of suitable acids include carboxylic acids such as butyric, valeric, caproic, caprylic, capric, lauric, myristic, palmitic, stearic, oleic, linoleic, phenylacetic, benzoic, o-, m-, and p-toluic, o-, m-, and p-chlorobenzoic, o-, m-, and p-bromobenzoic, phthalic, isophthalic, terephthalic, salicylic, anthranilic, and m- and p- aminobenzoic acids; hydroxide-substituted acids such as lactic, glyceric, and tartaric acids; oxo-substituted acids such as glyoxalic and formylacetic acids; and acid anhydrides such as propanoic and butanoic anhydrides. Also useful are mixtures of 2,4 pentanedione and cresylic acid.

Mixtures of the above-named diketones (preferably 2,4 pentanedione) and mineral acids, e.g. sulfuric, phosphoric, or hydrochloric acid, either alone or in combination with organic acid capable of forming soluble iron salts, may also be employed in the oxidation-controlling method of the invention, again preferably incorporated in an aqueous or other vehicle. A suitable exemplary range of proportions for such mixtures is 0.5–100 parts by weight of diketone to 5–700 parts by weight of mineral acid. The strong reducing action found in the keto acid-containing compositions described above is not of major significance in these mixtures; however, as in all of the foregoing compositions, application of the mineral acid—2,4 pentanedione mixtures to rust in the presence of water results in puffing and blistering and in some cases scaling or dissolution of the rust. If desired, glycerol may be incorporated in the latter mixtures, in a proportion of e.g. about 20% to about 30%. Glycerol, combined with 2,4 pentanedione, inhibits acids, and especially with phosphoric acid produces long lasting rust inhibition.

By way of further and more particular illustration of the compositions and method of the invention, there are set forth below specific examples of the above-described and other mixtures appropriate for use in the present method, i.e. providing oxidation control upon application to metal surfaces in the presence of water:

*Example I*

Twelve ounces of ascorbic acid were added to 500 cc. of water and heated to 60°–80° C. Five hundred cc. of 2,4 pentanedione were added, and after cooling the resulting crystals were collected. Twenty-two ounces of the crystalline reaction product were then mixed with 1 gallon of water. The result was a highly effective, relatively non-toxic, rust controlling composition being generally safe and useful in common rust dissolving or removing techniques.

If desired, a wetting agent may be added to the composition to increase its wetting power and speed of activity.

The water is initially added to the keto acid merely to facilitate mixing and reaction with the 2,4 pentanedione; however, virtually any liquid which will dissolve the acid and yet remain compatible with 2,4 pentanedione is suitable for this purpose; for example, alcohols and glycols have been found very suitable.

Example II

Two ounces of ascorbic acid were dissolved in 100 ounces of water and mixed thoroughly. Sixteen ounces of 2,4 pentanedione were then gradually added and mixed. The resultant endothermal reaction product produced a pH of about neutral (6.9–7.1) in one gallon of water.

Example III

|  | Parts |
|---|---|
| Sodium ascorbate | 5–150 |
| 2,4 pentanedione | .1–90 |
| Water up to 1 liter. | |

Example IV

|  | Parts |
|---|---|
| Potassium ascorbate | 22 |
| Reaction product of KOH and ascorbic acid to pH 7 | 40 |
| 2,4 pentanedione | 5 |
| Water up to 1 liter. | |

Example V

|  | Parts |
|---|---|
| Calcium ascorbate | 5–100 |
| 2,4 pentanedione | .1–90 |
| Water up to 1 liter. | |

Example VI

|  | Cc. |
|---|---|
| 2,4 pentanedione | 1 to 125 |
| Kerosene, or Varsol #2 (commercial paint thiner) | 10 to 2,000 |
| Pelargonic acid | 5 to 50 |

The strength and relative amounts will depend on the viscosity and penetrating or surface wetting power. This composition removed oxide formation from aluminum spools at a surprisingly fast and effective rate in locations where oxide jammed dies through which copper wire was drawn. This composition also was found effective in removing an oxide surface coating from a magnesium article, and protected metals from becoming oxide-contaminated for periods of several months. Longer oxide formation protection was achieved by the addition of a heavier hydrocarbon or silicone oil. Effective rust removal with this composition and others set out below not containing water or alcohol, must have a small amount of water added unless used on outside metal structures subject to inherent atmospheric moisture.

Example VII

|  | Amount | Range |
|---|---|---|
| 2,4 pentanedione, cc | 100 | .5–150 |
| Faxam 40 (an underwaxed hydrocarbon oil, 40 viscosity), cc | 680 | |
| Varsol #2 (paint thinner) or kerosene, cc | 120 | (¹) |
| Turpentine, cc | 50 | |
| Wax, e.g., paraffin, beeswax, etc., gr | 50 | |
| Ascorbic or pelargonic acid, gr | 10 | 5–50 |

¹ Varied to select viscosity.

Example VIII

|  | Oz. |
|---|---|
| 2,4 pentanedione | 16 |
| Cresylic acid | 2 |
| Varsol, Naphtha, etc., up to 1 gal. | |

Example IX

| | | |
|---|---|---|
| 2,4 pentanedione | oz | 4 |
| Wax, e.g., paraffin | lbs | 2 |

Example X

|  | Oz. |
|---|---|
| 2,4 pentanedione | 16 |
| Cresylic acid | 2 |
| Butyl Alcohol | 24 |
| Water | 20 |
| Naphtha or Varsol up to 1 gal. | |

Example XI

|  | Parts |
|---|---|
| 2,4 pentanedione | 2 |
| Pelargonic acid | .175 |
| Methyl alcohol | 4 |

Example XII

|  | Parts |
|---|---|
| 2,4 pentanedione | 5 |
| Pelargonic acid | 1 |
| Naphtha | 40 |

Example XIII

|  | Amount | Range |
|---|---|---|
| 2,4 pentanedione, cc | 250 | .5–300 |
| Glutaric acid, gr | 8 | 4–100 |
| Methyl alcohol | Up to 1 liter | |

Example XIV

|  | Amount | Range |
|---|---|---|
| 2,4 pentanedione, cc | 50 | 1–100 |
| Salicylic acid, gr | 5 | .1–5 |
| Paraffin wax, cc | 950 | 700–980 |

Example XV

|  | Amount | Range |
|---|---|---|
| 2,4 pentanedione, cc | 900 | 10–950 |
| Glycolic, or poly-glycolic acid, gr | 100 | 1–100 |

This combination in an oil or other non-aqueous vehicle, or added to another non-aqueous oxidation controlling composition of the present invention, results in floating rust much better and very good breaking of frozen metal parts.

Example XVI

|  | Amount | Range |
|---|---|---|
| 2,4 pentanedione, cc | 100 | .5–125 |
| Citric acid, gr | 65 | 1–120 |
| Water | To 1,000 cc. | |

Example XVII

|  | Amount | Range |
|---|---|---|
| 2,4 pentanedione, cc | 100 | .5–125 |
| Glycolic acid 70%, cc | 80 | 10–200 |
| Water | To 1 liter | |

Example XVIII

|  | Amount | Range |
|---|---|---|
| 2,4 pentanedione | 100 cc | .5–125 cc. |
| Diglycolic acid | 30 gr | 10–150 cc. |
| Water | To 1 liter | |

Example XIX

| | | |
|---|---|---|
| 2,4 pentanedione | cc | 100 |
| Potassium citrate | gr | 20 |
| Water | gr | 10–300 |

Example XX

| | Amount | Range |
|---|---|---|
| 2,4 pentanedione | 100 cc | |
| Either lead, tin, zinc, chromium, cadmium salt of pelargonic acid, azeleic acid, or sebacic acid | 5 gr | .1–10 gr. |
| Linseed oil | 100 cc | |
| or | | |
| Water | To 1,000 cc | .1–3 gr. |

Example XXI 2,4 pentanedione _____cc__ 100
Either lead, zinc, chromium, or cadmium
  acetate _____gr__ 5
Linseed oil _____cc__ 100

Example XXII

| | Amount | Range |
|---|---|---|
| 2,4 pentanedione, cc | 100 | 1–150 |
| Either sodium or potassium citrate, gluconate, oxalate, formate, glutarate, and similar salts of other acids capable of forming soluble iron salts, gr | 25 | 5–300 |
| An alkali hydroxide, e.g., sodium, potassium, ammonium hydroxide, gr | 50 | 0–300 |
| Water | To 1 liter | |

Example XXIII

| | Amount | Range |
|---|---|---|
| 2,4 pentanedione, cc | 100 | .5–100 |
| Sulfuric acid, cc | 30 | 5–50 |

Example XXIV

| | Amount | Range |
|---|---|---|
| 2,4 pentanedione | 100 cc | .5–125 cc. |
| Phosphoric acid | 80 cc | Up to 700 cc. |
| Glycerol | 20 cc | Up to 200 cc. |
| Water | To 1 liter | |

Example XXV

| | Amount | Range |
|---|---|---|
| 2,4 pentanedione, cc | 100 | .5–100 |
| Hydrochloric acid, cc | 35 | 5–80 |

Example XXVI

|  | Parts |
|---|---|
| Soda ash or caustic soda | 2–6 |
| Na or K gluconate | .15 |
| Tetrasodium phosphate | .30 |
| 2,4 pentanedione | .15 |

Water as desired for strength.

Example XXVII

| | Amount | Range |
|---|---|---|
| 2,4 pentanedione | 100 cc | 10–900 cc. |
| Alkaterge CO-900 (a substituted oxazoline-$C_9H_5ON$) | 900 cc | Up to 990 cc. |

This composition will protect deteriorated car finishes with high luster. Ascorbic acid may be added to advantage when a de-rusting application is desired.

Example XXVIII

| | Amount | Range |
|---|---|---|
| 2,4 pentanedione | 100 cc | .5 to 125 cc. |
| Alkali hydroxides, such as sodium, potassium, ammonium, etc., or alkali salts such as potassium or sodium citrates, gluconates, oxalates, ammonium oxalate, sodium glutamate and sodium, potassium, calcium and magnesium ascorbates. | 10 gr | Up to 300 gr. |
| Water | To 1 liter | |

Example XXIX 2,4 pentanedione _____cc__ 100
Ammonium, K, Na-cyanides, cyanates or sulfo-
  cyanides _____gr__ 70
Water to 1 liter.

Example XXX

|  | Oz. |
|---|---|
| Ascorbic acid | 2 |
| 2,4 pentanedione | 12 |
| 2,5 hexanedione | 4 |

Water to 1 gal.

It is to be understood that the invention is not limited to the procedures and embodiments hereinabove specifically set forth, but may be carried out in other ways without departure from its spirit.

I claim:

1. A method of controlling oxidation of a surface of metal selected from the class consisting of copper, brass, iron, aluminum, magnesium, zinc and uranium, comprising applying to the surface, in the presence of water, a mixture of
   (a) at least one compound selected from the class consisting of glycolic, diglycolic, gluconic, tannic, citric, oxalic, glutaric, sebacic, azeleic, pelargonic, butyric, valeric, caproic, caprylic, capric, lauric, myristic, palmitic, stearic, oleic, linoleic, phenylacetic, benzoic, o-, m-, and p-toluic, o-, m-, and p-chlorobenzoic, o-, m-, and p-bromobenzoic, phthalic, isophthalic, terephthalic, salicylic, anthranilic, m- and p-aminobenzoic, lactic, glyceric, tartaric, glyoxalic, and formylacetic acids, propanoic and butanoic acid anhydrides, lead, zinc, tin, chromium, cadmium, sodium and potassium salts of sebacic acid, azeleic acid and pelargonic acid, cresylic acid, ascorbic acid, 2-keto-1-gulonic acid, pyruvic acid, acetoacetic acid, levulinic acid, o-benzoylpropionic acid, beta-benzoylpropionic acid, sodium ascorbate, potassium ascorbate, calcium ascorbate and magnesium ascorbate; and
   (b) at least one diketone selected from the class consisting of 2,4 pentanedione and 2,5 hexanedione, said one compound being present in said mixture in a proportion of at least about 1% by weight, and said one diketone being present in said mixture in a proportion of at least about 0.1% by weight.

2. A method according to claim 1, wherein said diketone is 2,4 pentanedione and said one compound is ascorbic acid.

3. A method according to claim 2, wherein said surface is a surface of a ferrous metal.

4. A method of controlling oxidation of a surface of metal selected from the class consisting of copper, brass, iron, aluminum, magnesium, zinc and uranium, comprising applying to the surface, in the presence of water, a mixture of
   (a) between about 5 and about 700 parts by weight of at least one acid selected from the class consisting of sulphuric, hydrochloric and phosphoric acids and
   (b) between about 0.5 and about 100 parts by weight of 2,4 pentanedione.

5. A method according to claim 4 wherein said mixture contains glycerol in a proportion between about 20% and about 30% by weight.

6. A method of controlling oxidation of a surface of metal selected from the class consisting of copper, brass, iron, aluminum, magnesium, zinc and uranium, comprising applying to the surface, in the presence of water, a mixture of
 (a) at least one compound selected from the class consisting of the hydroxides, cyanides, cyanates, and sulfocyanides of sodium, potassium and ammonium; and
 (b) 2,4 pentanedione, present in a proportion of about 0.5 cc. to about 125 cc. for each 10–300 grams of said one compound present in said mixture.

7. A composition of matter, consisting essentially of
 (a) a mixture of
  (i) at least one diketone selected from the class consisting of 2,4 pentanedione and 2,5 hexanedione, present in said mixture in a proportion of at least about 0.1% by weight; and
  (ii) at least one other compound selected from the class consisting of ascorbic acid, 2-keto-1-gulonic acid, pyruvic acid, acetoacetic acid, levulinic acid, o-benzoylpropionic acid, beta-benzoyllinic acid, o-benzoylpropionic acid, betabenzoylpropionic acid, sodium ascorbate, potassium ascorbate, calcium ascorbate, magnesium ascorbate, glycolic acid, diglycolic acid, gluconic acid, and tannic acid, present in said mixture in a proportion of at least about 1% by weight; and
 (b) a liquid vehicle in which said one compound is soluble and which is compatible with said one diketone, said mixture being present in said vehicle in a proportion effective to control oxidation of a surface of metal to which said composition is applied, said metal being selected from the class consisting of copper, brass, iron, aluminum, magnesium, zinc and uranium.

8. A composition as defined in claim 7, wherein said diketone is 2,4 pentanedione and said one other compound is ascorbic acid.

9. A composition as defined in claim 8, wherein said vehicle is water, said 2,4 pentanedione being present in said composition in a proportion of at least about 0.108% by weight, and said ascorbic acid being present in said composition in a proportion of at least about 0.013% by weight.

10. A composition as defined in claim 8, wherein said vehicle is a liquid hydrocarbon.

11. A composition of matter consisting essentially of
 (a) a mixture of
  (i) 2,4 pentane dione; and
  (ii) at least one compound selected from the class consisting of the hydroxides, cyanides, cyanates and sulfocyanides of sodium, potassium and ammonium, there being present in said composition between about 10 and about 300 grams of said one compound for each 0.5 to 125 cubic centimeters of 2,4 pentanedione; and
 (b) water, said mixture being present in said water in a proportion effective to control oxidation of a surface of metal to which said composition is applied, said metal being selected from the class consisting of copper, brass, iron, aluminum, magnesium, zinc and uranium.

12. A composition of matter consisting essentially of
 (a) a mixture of
  (i) 2,4 pentanedione; and
  (ii) at least one compound selected from the class consisting of the lead, zinc, tin, chromium, cadmium, sodium and potassium salts of sebacic acid, azeleic acid and pelargonic acid, there being present in said composition between about 5 and about 125 grams of said one compound for each 1 to 150 cc. of 2,4 pentanedione; and
 (b) a liquid vehicle in which said one compound is soluble and which is compatible with 2,4 pentanedione, said mixture being present in said vehicle in a proportion effective to control oxidation of a surface of metal to which said composition is applied, said metal being selected from the class consisting of copper, brass, iron, aluminum, magnesium, zinc and uranium.

References Cited

UNITED STATES PATENTS

| | | | |
|---|---|---|---|
| 1,752,145 | 3/1930 | Calcott et al. | 252—396 XR |
| 2,165,261 | 7/1939 | Hewlett et al. | 252—457 XR |
| 2,176,747 | 10/1939 | Schneider et al. | 44—69 |
| 2,197,498 | 4/1940 | Guthmann | 252—407 XR |
| 2,316,012 | 4/1943 | Miller | 44—77 |
| 2,353,210 | 7/1944 | Williams | 252—396 XR |
| 2,430,058 | 11/1947 | Klaber | 252—396 XR |
| 3,062,612 | 11/1962 | Le Boucher | 21—2.5 |

OTHER REFERENCES

Rose et al., "The Condensed Chemical Dictionary," 6th ed., (1961), pp. 10, 120, 280, 538, 1010.

Lundberg, "Antioxidation and Antioxidants," vol. II, (1962) pp. 506–508, QD 281 O.G.68 C.2.

Merck Index, 6th ed., (1952), page 10 relied on.

LEON D. ROSDOL, *Primary Examiner.*

M. WEINBLATT, *Assistant Examiner.*

UNITED STATES PATENT OFFICE
CERTIFICATE OF CORRECTION

Patent No. 3,349,043                            October 24, 1967

John A. Manning

It is hereby certified that error appears in the above numbered patent requiring correction and that the said Letters Patent should read as corrected below.

Column 1, line 50, for "an acid" read -- and acid --; column 2, line 50, for "oxide with" read -- oxide from --; column 7, line 13, for "Chemisty" read -- Chemistry --; column 9, line 35, for "thiner" read -- thinner --; column 13, line 23, strike out "linic acid, o-benzoylpropionic acid, betabenzoyl-".

Signed and sealed this 5th day of November 1968.

(SEAL)
Attest:

Edward M. Fletcher, Jr.                                EDWARD J. BRENNER
Attesting Officer                                            Commissioner of Patents